United States Patent
Griffith et al.

(10) Patent No.: US 7,832,879 B2
(45) Date of Patent: Nov. 16, 2010

(54) HEAT DISSIPATING LAYERS IN DEFORMABLE MIRRORS

(75) Inventors: Michael Stewart Griffith, Chelmsford (GB); Leslie Charles Laycock, Ongar (GB)

(73) Assignee: Bae Systems PLC, London (GB)

( * ) Notice: Subject to any disclaimer, the term of this patent is extended or adjusted under 35 U.S.C. 154(b) by 102 days.

(21) Appl. No.: 11/663,088

(22) PCT Filed: Sep. 13, 2005

(86) PCT No.: PCT/GB2005/050156
§ 371 (c)(1),
(2), (4) Date: Mar. 16, 2007

(87) PCT Pub. No.: WO2006/046078
PCT Pub. Date: May 4, 2006

(65) Prior Publication Data
US 2008/0037146 A1    Feb. 14, 2008

(30) Foreign Application Priority Data
Sep. 21, 2004    (EP) .................................. 04255727
Sep. 21, 2004    (GB) .................................. 0420950.8

(51) Int. Cl.
*G02B 5/08*    (2006.01)
(52) U.S. Cl. .................................................... 359/846
(58) Field of Classification Search ......... 359/223–226, 359/290–291, 871, 872, 846, 883, 845
See application file for complete search history.

(56) References Cited
U.S. PATENT DOCUMENTS
6,900,926 B2 * 5/2005 Ribak .......................... 359/299

7,190,502 B2 * 3/2007 Filhol .......................... 359/224

FOREIGN PATENT DOCUMENTS

| | | |
|---|---|---|
| DE | 199 55 574 A1 | 7/2001 |
| EP | 0 529 282 A3 | 3/1993 |
| EP | 1 376 092 A2 | 1/2004 |
| JP | 1-312505 | 12/1989 |
| JP | 04013102 | 1/1992 |

OTHER PUBLICATIONS

Alexis Kudryashov et al., "High-power lasers and adaptive optics", Proceedings of the SPIE—The International Society for Optical Engineering SPIE-Int. Soc. Opt. Eng USA, vol. 5333, No. 1, Jun. 2004, pp. 45-52.

(Continued)

*Primary Examiner*—Euncha P Cherry
(74) *Attorney, Agent, or Firm*—Buchanan Ingersoll & Rooney PC

(57) ABSTRACT

This invention relates to improvements in thermal management in deformable mirrors. In particular, this invention relates to a deformable mirror comprising a heat spreader used to distribute thermal energy evenly across the mirror.

Diamond material 104, on account of its extremely high thermal conductivity, is a preferred choice of heat spreader which permits build up of thermal energy in the mirror 100 to be quickly and evenly distributed across the entire mirror surface, increasing the working life of the mirror.

21 Claims, 3 Drawing Sheets

OTHER PUBLICATIONS

Vadim Samarkin et al., "Semipassive bimorph correctors for multi-purpose applications", Proceedings of the SPIE—The International Society for Optical Engineering SPIE-Int. Soc. Opt. Eng USA, vol. 4839, 2003, pp. 741-749.

O. Von Der Lühe et al., "Gregor: a 1.5 m telescope for solar research", Astronomische Nachrichten Wiley-VCH Germany, vol. 322, No. 5-6, 2001, pp. 353-360.

Edric Mark Ellis, "Low-cost Bimorph Mirrors in Adaptive Optics", Imperial College of Science, Technology and Medicine, University of London, London, Apr. 1999, pp. 1-170.

Alexis V. Kudryashov et al., "Control of high power $CO_2$ laser beam by adaptive optical elements", Optics Communications, North-Holland Publishing Co. Amsterdam, NL, vol. 118, No. 3, Jul. 15, 1995, pp. 317-322.

Johannes K. Dürr et al., "Development and Manufacture of an Adaptive Lightweight Mirror for Space Application", Amart Materials and Structures IOP Publishing UK, vol. 12, No. 6, 2003, pp. 1005-1016.

Mark A. Ealey, "Large Optics in the 21st Century: A Transition from Discrete Manufacturing to Highly Integrated Techniques", Aerospace Conference, 2003, Proceedings, IEEE, vol. 4, Jan. 2004, pp. 1705-1716.

International Search Report dated Nov. 15, 2005 and European Search Report dated Feb. 16, 2005.

* cited by examiner

HEAT DISSIPATING LAYERS IN DEFORMABLE MIRRORS

This invention relates to improvements in thermal management in deformable mirrors, and more particularly, though not exclusively, to a deformable mirror comprising a heat spreader used to distribute thermal energy evenly across the mirror.

Deformable mirrors are often used in the field of adaptive optics. For example, phase distortions in a signal may be sensed by a wavefront sensor and these distortions may be corrected for using a deformable mirror linked to an appropriate control system. Such deformable mirrors may be employed in numerous fields, including:

- imaging, for example deformable mirrors are used in astronomy to improve the resolution of earth-based telescopes that are otherwise affected by atmospheric distortions;
- laser sensing, where the amount of laser light that can be delivered onto a target is significantly increased by using a deformable mirror to correct for atmospheric distortions—this enables either better information to be obtained or objects to be identified at a greater range; and
- laser generation, where a deformable mirror can be used intra-cavity within a high power laser to counter the thermal blooming that can be otherwise induced by the high concentration of laser light inside the cavity.

The two main operational parameters of a deformable mirror are its bandwidth and its stroke. Bandwidth determines how quickly the mirror can be deformed and hence, for example, how quickly the mirror can respond to the variations in atmospheric turbulence. Stroke corresponds to the maximum displacement of the mirror when deformed and this determines, for example, the level of turbulence that can be corrected. Ideally, both bandwidth and stroke would be maximised.

Deformable mirrors generally comprise a substrate bonded to an active element. The active element applies a deforming force to the substrate, either directly in the case of an active element comprising one or more actuators, or as a result of transverse expansion or contraction of an active material layer relative to the substrate bonded to it, as with a bimetallic strip, resulting in the substrate adopting a convex shape for example. The active element is usually a piezoelectric material layer that is bonded to a passive substrate layer using an epoxy resin. Unimorph and bimorph mirrors conform to this general arrangement.

Another issue that needs addressing is that of thermal management. The two main aspects of this are that heat absorbed from any incident radiation must be dissipated, and that temperature fluctuations may affect the performance of the mirror. If the mirror is excessively heated, the active element will de-pole or lose efficiency. If the materials used for the passive substrate and the active element have linear thermal expansion coefficients that are very different, the pair of materials will act as a bimetallic strip and distortions will be introduced into the mirror as the temperature of the mirror changes. This can be corrected for by applying a corresponding bias to the active element, but this will reduce the available stroke of the mirror.

It is known to minimise thermal management problems by using a very high-reflectivity surface so that very little of the incident radiation is absorbed. However, mirrors designed for use with very high power incident radiation must usually comprise some form of active cooling. Although it is possible to fabricate sufficiently high reflectivity surfaces, any small defect on the surface (for example, a speck of dust) will lower the reflectivity locally potentially resulting in damage to the mirror when subjected to such high power radiation.

It is known to use water cooling to cool deformable mirrors (see, for example, the disclosure in the Applicant's published International (PCT) Patent Application, reference WO 04/057406, published on 8 Jul. 2004). In these arrangements, water is allowed to flow through channels formed within a mirror substrate.

The typical intensity profile of high-power lasers is Gaussian. Thus deformable mirrors used in conjunction with high-power lasers are subject to a non-uniform profile of incident radiation, with the intensity of incident radiation at the mirror center several orders of magnitude greater than that at the edge. This leads to a high risk of the development of small, localised hot patches on the mirror surface that cannot be effectively dealt with using existing mirror cooling techniques. The existence of hot patches, or indeed any significant differential in thermal conditions across the mirror surface, can dramatically reduce the working life of the mirror.

The present invention aims to overcome or substantially reduce at least one of the above-mentioned problems associated with prior-known deformable mirrors.

In broad terms, the present invention resides in the concept of using a heat spreader in deformable mirrors to distribute thermal energy from non-uniform incident radiation sources.

Thus, according to a first aspect of the present invention there is provided a deformable mirror comprising a heat spreader thermally coupled to a surface of the mirror.

Further, according to a second aspect of the present invention there is provided a deformable mirror, comprising an electro-restrictive plate coupled to a passive substrate layer; a mirror surface; a plurality of electrodes comprising at least one electrode in contact with a region on a first surface of the electro-restrictive plate and a common electrode in contact with a second surface of the electro-restrictive plate; and a heat spreader thermally coupled to the mirror surface.

Preferably, the coefficient of thermal expansion of the heat spreader is substantially similar to the coefficient of thermal expansion of the electro-restrictive plate. Matching the mirror component parts in this way means that the mirror is insensitive to changes in ambient temperature, thereby obviating the problem of unwanted deformation of the mirror when the component parts are not well matched.

Optionally, the heat spreader comprises a layer of material interleaved between the mirror surface and the electro-restrictive plate.

Preferably, the heat spreader comprises diamond material. As will be described more fully hereinafter diamond, on account of its extremely high thermal conductivity, is a suitable heat spreader which permits the build up of thermal energy in the mirror to be quickly and evenly distributed across the entire mirror surface, increasing the working life of the mirror since hot patches are avoided. It has been found that a diamond heat spreader comprising a layer of material between 200 µm and 500 µm thick is particularly suitable for this purpose.

Whilst diamond is a preferred choice of material for the heat spreader, it is possible to use other highly thermally conducting materials in place of diamond. For example, the heat spreader could instead comprise silicon carbide (SiC) material.

Conveniently, the reflectivity of the mirror surface is between 99.99% and 99.999% and the diameter of the mirror is between 2 cm and 5 cm.

Advantageously, the heat spreader acts as a passive substrate for the deformable mirror.

Optionally, suitable heat dispersion means (water cooling for example) is provided to at least partially remove thermal energy from the heat spreader.

Optionally, the heat dispersion means comprises a thermal mass in thermal contact with the heat spreader such that excess thermal energy present in the heat spreader is absorbed by the thermal mass.

Further, it will be understood that the present invention extends to the above described deformable mirror in combination with a mirror holder.

The inventors have also recently recognised a further advantage of using materials such as diamond/silicon carbide (SiC) over glass as substrates.

For mirrors supported from below by a number of pillars, a glass substrate has a resonant frequency of the order of 4 KHz. The stroke varies across the surface of the mirror: where it is 'held' by the support, the stroke is ~25 µm, and away from the supports, it is ~30 µm. Using SiC (a stiff material with a high Young's modulus), the stroke is uniform across the surface at 35 µm. Thus the higher quality material increases stroke (as well as bandwidth: resonant frequency with SiC is ~5 KHz). Note that diamond is harder than SiC and so it is expected to produce better results, besides increasing the durability of the mirror.

The above and further features of the invention are set forth with particularity in the appended claims and will be described hereinafter, by way of example only, with reference to the accompanying drawings of which:

In all preferred embodiments of the present invention described herein, the deformable mirror is ideally, though not exclusively suited for use with high power lasers. The deformable mirror comprises a mirror surface of high reflectivity. In typical embodiments, the reflectivity of the surface is between 99.99% and 99.999%, so that only a small fraction of the incident energy is absorbed. The high reflectivity therefore minimises the temperature increase in the mirror due to absorption of incident energy. However, further thermal management measures, such as those described below, are necessary when the deformable mirror is to be used in high power laser applications. By "high power", we mean this to cover incident power densities of the order of 1 KW/cm² or higher. Furthermore, all the mirrors described herein are expected to be small, preferably, but not exclusively, with diameters ranging up to 5 cm. Such sizes are typical for mirrors used in high power laser applications.

Figure 1:
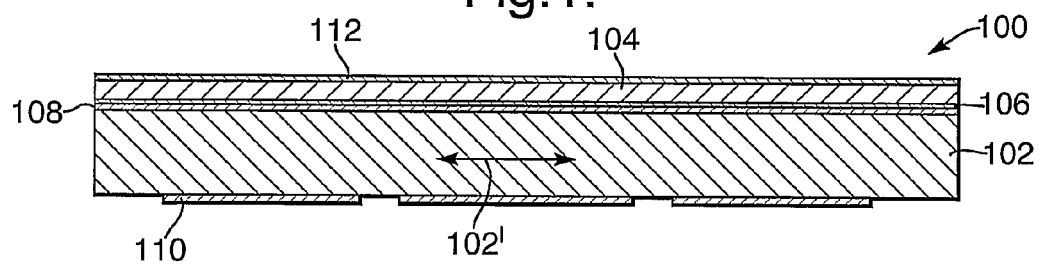
FIG. 1 is a cross-sectional view of a deformable mirror according to a first embodiment of the invention.

FIG. 1 shows a deformable mirror 100 according to a first embodiment of the present invention. The deformable mirror 100 is a unimorph mirror comprising an active PZT element 102 and a passive diamond substrate 104. The active PZT element 102 is poled in the direction, as indicated schematically by arrow 102'. A common electrode 108 is provided in contact with a first surface of the PZT element 102 and discrete electrodes 110 are provided each covering different regions of a second, opposite surface of the PZT element 102. The electrodes 108, 110 enable an electric field to be applied to selected regions of the active PZT element 102. A diamond layer 104 is formed as a free standing film by plasma enhanced chemical vapour deposition (PECVD), and then bonded preferably over the common electrode 108 and any remaining exposed areas of the first surface of the active PZT element 102 using epoxy resin 106. Alternatively, the diamond layer 104 may be bonded over the discrete electrodes 110 on the second surface of the active PZT element 102. A reflective mirror surface 112 is formed over the diamond substrate 104 by depositing a suitable metal layer and polishing it to a high optical quality finish. Since the PECVD diamond 104 has a very high thermal conductivity, of the order of 20-25 W/cmK at room temperature (approximately five times greater than that of copper at the same temperature), it acts as a heat spreader besides acting as a passive substrate layer relative to the expansions and contractions of the active PZT element 102. PECVD diamond is well-suited to this task since its coefficient of thermal expansion is typically 1 ppm/°C., closely matching that of some forms of PZT. This means that deformable mirror 100 using PECVD diamond as a heat spreader and passive substrate is insensitive to changes in ambient temperature that can otherwise cause deformation of deformable mirrors when component parts are not well matched.

As mentioned above, the Gaussian profile of laser radiation can create hot patches due to the greater incidence of thermal energy at the mirror center. However, the high thermal conductivity of the PECVD diamond layer 104 allows the thermal energy at the center of the mirror 100 to be quickly distributed across the entire reflective mirror surface 112, reducing the temperature increase at the mirror center. This increases the working life of the mirror since hot patches are substantially avoided. Furthermore, when pulsed high power lasers are used, the presence of the diamond head spreader layer 104 allows the pulse repetition rate to be increased: less time is needed for the mirror reflective surface 112 to cool since the increase in temperature is reduced.

The embodiment of FIG. 1 is suitable for mirrors of diameters up to 50 mm. As the diameter increases, the stiffness, and thus the thickness, of the mirror must also increase in order to maintain a constant resonant frequency and hence a constant bandwidth. Since diamond has a significantly higher Young's modulus than PZT, the thickness of the passive diamond substrate 104 can be less than (for example, a half of) the thickness of the active PZT element 102. While diamond layers of up to 500 µm in thickness can be grown, the length of time required to deposit thicker layers and their cost is likely to be prohibitive, and so the embodiment shown in FIG. 1 is not appropriate where thicker substrates are required. This leads to a preferred upper limit of about 50 mm for the diameter of deformable mirror 100 incorporating a diamond heat spreader/passive substrate layer 104.

Figure 2:
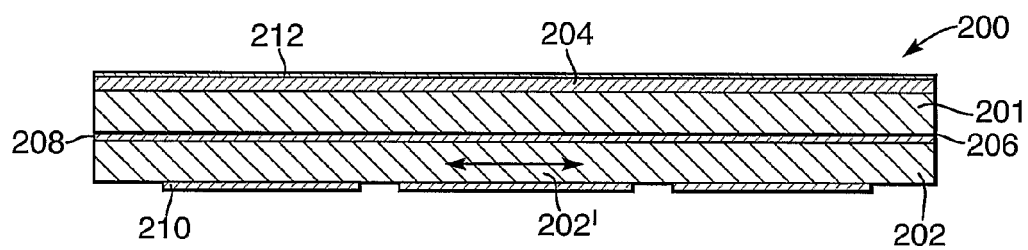
FIG. 2 is a cross-sectional view of a deformable mirror according to a second embodiment of the invention.

FIG. 2 shows a deformable mirror 200 according to a second embodiment of the present invention. Here, components equivalent to those shown in FIG. 1 are given the same reference numerals, incremented by 100. The equivalent components are not described in detail in order to avoid repetition. The embodiment of FIG. 2 is largely similar to that of FIG. 1, but is suitable for the fabrication of larger mirrors or smaller mirrors of lower cost than would achievable in the first embodiment. An additional passive substrate 201 is included in the embodiment of FIG. 2, between a PECVD diamond heat spreader layer 204 and an active PZT layer 202. The additional passive substrate 201 enables the passive part of the mirror (comprising both the diamond layer 204 and the additional passive substrate layer 201) to be made thicker without the need for an impractically thick and costly diamond layer 204, thereby enabling larger mirrors, or small lower cost mirrors, that still incorporate a diamond heat spreader to be made. In order to function efficiently as a heat spreader, the diamond layer 204 should be kept as thick as is practical, preferably or the order of 200 µm, since this will maximise the speed at which incident thermal energy is distributed. As the diamond layer 204 becomes thinner, its thermal resistance increases so that its efficiency as a heat spreader is significantly impaired. The efficiency of the layer 204 as a heat spreader must therefore be balanced against the length of time taken to deposit the diamond. Typically, the diamond layer 204 is between 200 µm and 500 µm thick, although more preferably is between 200 µm and 300 µm thick. The material used for the additional passive substrate layer 201 should have a relatively low density, but a high Young's modulus, and a thermal expansion coefficient well matched to the active PZT layer 202 and PECVD diamond layer 204. Note that the active PZT element 202 is poled in the direction as indicated schematically by arrow 202'. Silicon carbide (SiC) is a preferred choice of material for this additional passive substrate layer 201, since diamond can be grown directly onto it. The relatively low thermal expansion coefficient of SiC is well matched to both PECVD diamond and PZT. Furthermore, the growth of PECVD diamond on SiC is well-established technology that is regularly used in the fabrication of diamond-coated SiC tools. The mirror surface 212 is again formed over the diamond layer 204.

The additional passive substrate layer 201 can also be used to actively cool the mirror. Cooling channels (not shown in FIG. 2) can be formed in the additional passive substrate layer 201, and water piped in either from the edge of the layer or from underneath, as is described for example in the Applicant's published International (PCT) Patent Applications, references WO 04/057406 and WO 04/057408, published on 8 Jul. 2004, and WO 05/040885, published 6 May 2005. Maintaining a flow of water through these channels then cools the mirror. The presence of active cooling further enhances the power handling capabilities of the mirror, and the water cooling is made more efficient since the diamond heat spreader 204 spreads thermal energy over a wider surface.

Figure 3:
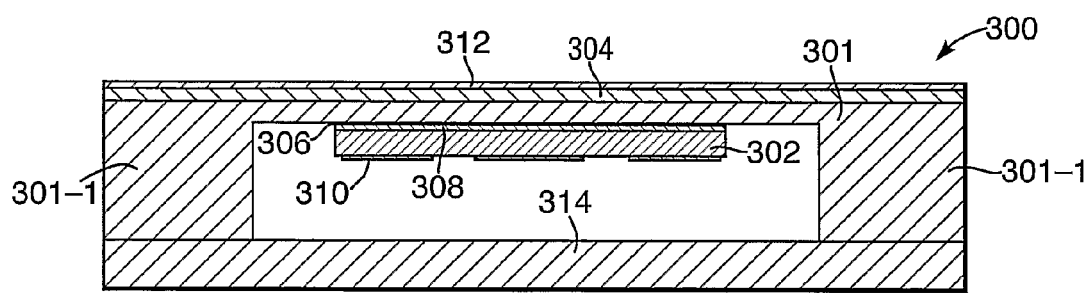
FIG. 3 is a cross-sectional view of a deformable mirror according to a third embodiment of the invention.

FIG. 3 shows a deformable mirror 300 according to a third embodiment of the invention. Components equivalent to those shown in FIG. 2 are given the same reference numerals, incremented by 100. The equivalent components here are not described in detail in order to avoid repetition. The deformable mirror 300 has certain features in common with the second embodiment 200 shown in FIG. 2 but with the addition of a cooling structure provided to disperse heat from a PECVD diamond heat spreader layer 304. Active cooling of the mirror 300 is rendered unnecessary by the additional cooling structure. The additional cooling structure is provided by an extension to a additional passive substrate layer 301, which in this third embodiment extends outwardly beyond the perimeter of an active PZT element 302. The layer 301 then extends downwardly in an annulus 301-1 to a base 314 formed of the same material. The annulus 301-1 thus also acts as a support for the deformable mirror 300 as a whole. The passive substrate 301 and the annular support 301-1 are formed preferably as one piece. Note that the support 301-1 also cools the mirror surface by conduction of heat away from a diamond heat spreader layer 304 that is bonded onto the passive substrate layer 301 (in a similar manner to that in FIG. 2), and from the mirror surface 312, to the comparatively large thermal mass of the base 314. The annular support 301-1 thus provides the cooling structure, improving the power handling capabilities of the mirror.

Figure 4:
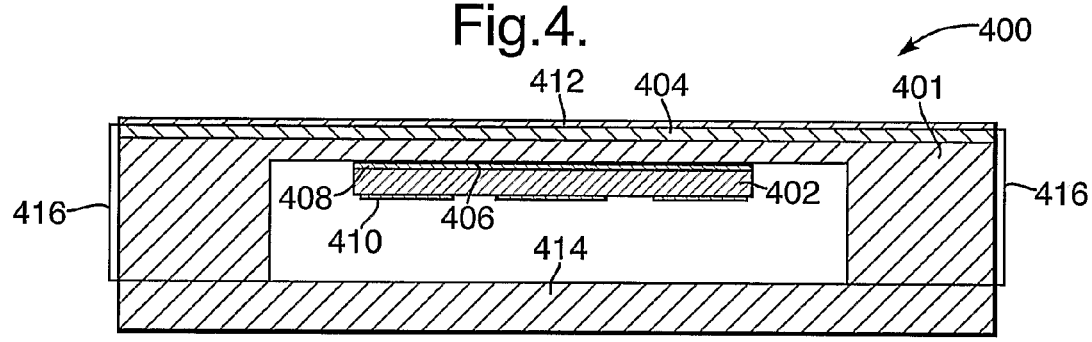
FIG. 4 is a cross-sectional view of a deformable mirror according to a fourth embodiment of the invention.

FIG. 4 shows a fourth embodiment of the present invention comprising a deformable mirror 400 that is largely similar to that shown in FIG. 3. Components equivalent to those shown in FIG. 3 are given the same reference numerals, incremented by 100. Equivalent components are not described in detail in order to avoid repetition. In this fourth embodiment, the diamond heat spreader 404 has been extended to cover the peripheral surface of an annular support 401, equivalent to the extended annular structure 301-1 of FIG. 3, to improve the conduction of heat to the base of the mirror. The extension 416 of the diamond layer 404 increases the area over which thermal energy incident on the mirror 400 is spread, further improving the power handling capabilities of the mirror.

Figure 5:
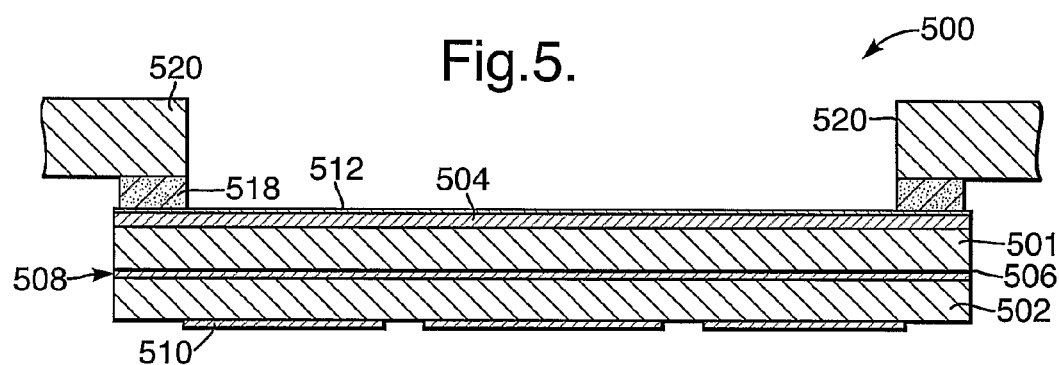
FIG. 5 is a cross-sectional view of a deformable mirror according to a fifth embodiment of the invention.

FIG. 5 shows a deformable mirror 500 according to a fifth embodiment of the present invention. Here, components equivalent to those shown in FIG. 2 are given the same reference numerals, but incremented by 300. Again, the equivalent components here are not described in detail in order to avoid repetition. The mirror 500 broadly corresponds to that shown in FIG. 2, but in this embodiment the mirror is attached to a supporting member 520 by a thermally conductive glue 518. As in the third and fourth embodiments described above with reference to FIGS. 3 and 4 respectively, additional cooling is provided by conduction of heat away from the mirror surface 512 through the support 520 to a base (not shown in FIG. 5), and active cooling of the mirror itself is rendered unnecessary. In this embodiment, however, heat is conducted away from the mirror surface 512 via the glue 518 rather than through a one-piece substrate and support structure. The glue 518 can be a thick layer of compliant thermally-conductive epoxy, for example as disclosed in Applicant's published International Patent Application, reference WO 05/040885, published 6 May 2005, thereby improving the stroke of mirror 500. The thermal conduction of the glue layer 518 may be enhanced by providing a thicker glue layer.

Figure 6:
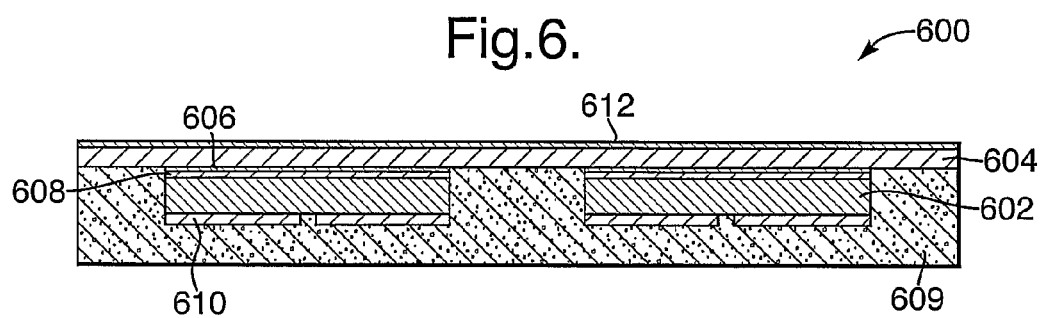
FIG. 6 is a cross-sectional view of a deformable mirror according to a sixth embodiment of the invention.

FIG. 6 is a cross-sectional view of a deformable mirror 600 according to a sixth embodiment of the present invention. The mirror arrangement 600 shares a number of features in common with that shown in FIG. 1, components equivalent to those shown in FIG. 1 being given corresponding reference numerals incremented by 500. In this sixth embodiment, the active element comprises an annulus 602 of PZT material partially embedded in and thus supported by a thermally conductive, compliant foam 609 of the kind disclosed in Applicant's published International Patent Application, reference WO 05/040885, published 6 May 2005, for example a metallic, silicon or silicon carbine foam, or a graphite foam such as PocoFoam™. The PZT annulus 602 is provided with a annular common electrode 608 bonded to one face of the annulus 602 and a number of discrete electrodes 610 bonded to the opposing face. The PZT annulus 602 is embedded in the compliant foam 609 to a depth equivalent to the thickness of the annulus 602 including the bonded electrodes 608, 610, so that the foam 609 fills the central hole in the annulus 602 and provides support beyond the peripheral edge of the annulus 602, but to substantially the same level as the common electrode 608. A diamond heat spreader layer 604 is bonded to the surface provided by the common electrode 608 and the surrounding compliant foam 609 and a polished metallic mirror surface 612 is provided over the diamond layer 604.

Electrical connection to the discrete PZT electrodes 610 is preferably achieved by means of thin metal strips embedded in the compliant foam 609 (as disclosed for example in Applicant's published International Patent Application, reference WO 05/040885, published 6 May 2005). Thus, as shown in this embodiment, the inventors have cleverly devised a mirror arrangement 600 in which the diamond layer 604, bonded to the PZT annulus 602, has a mirror surface 612 suitable for use with a high power laser (not shown) in a Cassigrain arrangement in which the center of the mirror does not need to be active.

Figure 7:
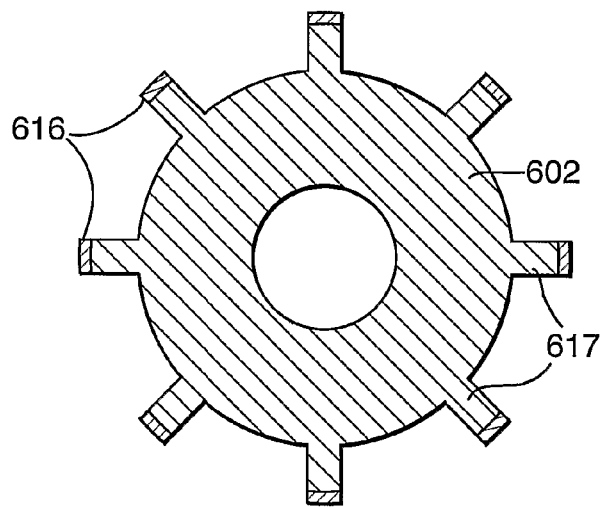
FIG. 7 is a top view of the PZT annulus element of the mirror arrangement of FIG. 6.

FIG. 7 shows a top schematic view of the annular PZT element 602 in the mirror arrangement of FIG. 6. As can be seen in FIG. 7, the PZT annulus 602 comprises a plurality of protruding arms 617 which extend radially outward from the main body of the PZT element 602. Each protruding arm 617 is provided with a bond pad array on its tip end 616 to enable electrical connection to respective electrodes 608, 610. Electrical connection to this bond pad can be made in various ways (as disclosed for example in Applicant's pending International Patent Application No. PCT/GB05/002477, filed 22 Jun. 2005). It is to be appreciated that the particular shape, size and number of the arms 617 used is not critical and that these can adopt other ordered orientations from that shown in FIG. 7 so as to achieve the desired technical effect.

It is also to be appreciated that the mirror arrangement of FIG. 6 can be mounted on a platform supported by actuators if desired, to provide integrated tip-tilt for example (as disclosed in Applicant's published International Patent Application, reference WO 05/040885, published 6 May 2005).

Figure 8:
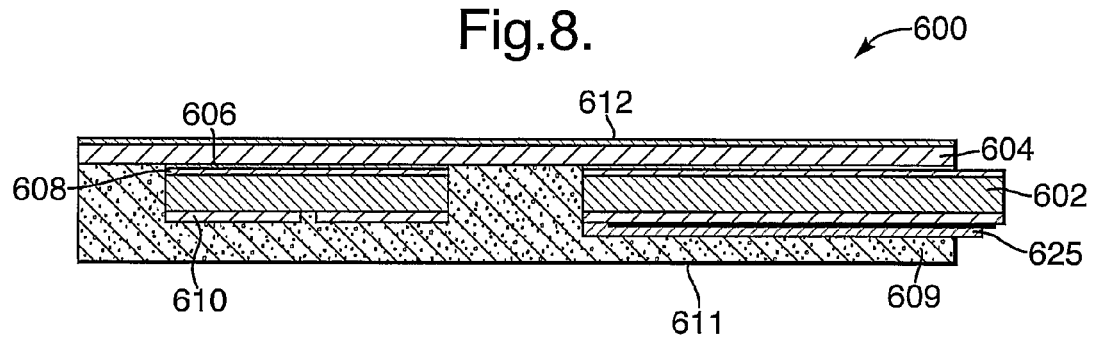
FIG. 8 is another cross-sectional view of the mirror of FIG. 6 showing how a passivation layer is applied to mutually insulate the electrodes on the PZT element.

FIG. 8 is another cross-sectional view of the mirror of FIG. 6 showing a passivation layer 625 of silicon dioxide, for example, applied to mutually insulate the discrete electrodes 610 attached to the PZT element 602.

In this sixth embodiment, the high thermal conductivity foam 609 comprises a metal foam/PocoFoam™ (an open cell carbon foam with high thermal conductivity, as will be appreciated by a person skilled in the art). The purpose of the foam material 609 in use is to conduct the heat directly away from the diamond layer 604 from the center and from around the periphery of the PZT annulus 602. If desired, a base 611 of the arrangement 600 to which the foam 609 is bonded can itself be cooled.

It is envisaged that an open cell foam structure 609 is to be used in the arrangement 600 when active cooling is required. For example, when the edges of the foam 609 are sealed to be fluid (air/water) tight, the fluid can be fed through the foam in any suitable shape/configuration to cool the mirror. In the case of water being piped under the PZT annulus 602, it will be understood that the PZT annulus 602 and associated control electrodes 610 and connecting tracks will have to be sealed against coming into contact with the water. Where the center of the mirror is additionally required to be active (not shown), it will also be understood that a PZT disc would be used rather than an annulus and that cooling would then occur round the outside only.

Having thus described the present invention by reference to various preferred embodiments, it is to be appreciated that the embodiments are in all respects exemplary and that modifications and variations are possible without departure from the spirit and scope of the invention. For example, it is well known how to modify the number and configuration of electrodes on the active PZT element. Furthermore, whilst all the embodiments described above use a PZT active element, it is possible to use any other electro-restrictive material, or a magnetic-restrictive material such as PMN (a material comprised of lead, magnesium, niobium and oxygen).

Whilst, as described above in the first embodiment shown in FIG. 1, the diamond layer 104 is bonded to the active element 102 using an epoxy resin 106, it is also possible to deposit the PECVD diamond layer 104 directly onto the PZT layer 102.

In all the embodiments except the first, it is possible to improve the power handling capabilities of the mirror by the inclusion of active water cooling of the mirror itself, as described with reference to the second embodiment if required. Water cooling of a support structure can also be provided to improve power handling. Such active cooling can be either included or omitted, depending on the requirements of a given mirror application. Whilst thermal management is improved by active cooling, a cheaper overall product is obtained by its omission.

Depending on the required optical quality of the mirror finish, and the wavelength of radiation for which the mirror is to be used, it may be necessary to deposit a thin planarisation layer between the diamond heat spreader layer and the mirror surface. PECVD diamond is polycrystalline, and cannot be polished to a sufficient flatness for a high quality optical finish; although it may be possible to form the mirror directly onto the PECVD diamond where the finish is not critical, or where the mirror is to be used with long wavelength radiation. When an additional planarisation layer is required, suitable planarisation materials include silicon carbide (particularly preferred as it is well matched to PECVD diamond), silicon dioxide, silicon nitride, silicon, hard metals such as nickel, or any hard amorphous material.

Whilst the use of CVO silicon carbide for the additional passive substrate has been described in the above, it is possible to use a number of other materials. Examples include carbon reinforced and reaction bonded silicon carbide, other ceramics, silicon, and refractory metals such as molybdenum and tungsten. PECVD diamond can be grown directly onto these materials. If the diamond is grown as a free-standing film, other materials including glasses such as Pyrex and borosilicate, carbon composites or silicon alloys can be used. Alternatively, a second PZT disc, identical to the first, can be used to act as an additional passive substrate. The use of a second PZT disc would reduce the sensitivity of the mirror to changes in the ambient temperature.

Furthermore, whilst PECVD diamond is a preferred material for the heat spreader due to its extremely high thermal conductivity, it is possible to use other highly thermally conducting materials. Candidates include chemical vapour deposition silicon carbide (onto which a mirror finish can be directly deposited), natural graphite, pyrolytic graphite and diamond-like carbon.

Whilst the embodiments described all relate to unimorph deformable mirrors, it is to be understood that the invention is equally applicable to other forms of deformable mirrors, including bimorph mirrors, in which there are two active PZT layers.

It is to be understood that any feature described in relation to one embodiment may be used alone, or in combination with other features described, and may also be used in combination with one or more features of any other of the embodiments, or any combination of any other of the embodiments.

The invention claimed is:

1. A deformable mirror, comprising an electro-restrictive plate coupled to a passive substrate layer; a mirror surface; a plurality of electrodes comprising at least one electrode in contact with a region on a first surface of the electro-restrictive plate and a common electrode in contact with a second surface of the electro-restrictive plate; and a heat spreader layer extending with a rear of the mirror surface, and thermally coupled thereto so as to reduce differentials in thermal conditions across the mirror surface, the heat spreader layer having a thermal conductivity at least equal to that of silicon carbide.

2. The deformable mirror as in claim 1, wherein the heat spreader layer comprises a layer of material interleaved between the mirror surface and the electro-restrictive plate.

3. The deformable mirror as in claim 1, wherein the heat spreader layer and the passive substrate layer are combined as a single layer of a single material.

4. The deformable mirror as in claim 1, wherein the passive substrate layer comprises a layer of silicon carbide (SiC) material.

5. The deformable mirror as in claim 1, wherein the coefficient of thermal expansion of the heat spreader layer is substantially similar to the coefficient of thermal expansion of the electro-restrictive plate.

6. The deformable mirror as in claim 1, wherein the heat spreader layer material is chosen from the group consisting of silicon carbide, diamond, diamond-like carbon, natural graphite and pyrolytic graphite.

7. The deformable mirror as in claim 6, wherein the heat spreader layer comprises a layer of diamond material between 200 μm and 500 μm thick.

8. The deformable mirror as in claim 7, wherein the heat spreader layer comprises a layer of diamond material of between 200 μm and 300 μm thick.

9. A deformable mirror comprising a mirror surface, an active deforming element, and a heat spreader layer extending across a reverse side of the mirror surface and thermally coupled thereto so as to distribute thermal energy across the entire mirror surface, the heat spreader layer being disposed between the mirror surface and the active element, and having a thermal conductivity at least equal to that of silicon carbide.

10. The deformable mirror as in claim 9, wherein the heat spreader layer is chosen from the group consisting of silicon carbide, diamond, diamond-like carbon, natural graphite and pyrolytic graphite.

11. The deformable mirror as in claim 9, wherein the reflectivity of the mirror surface is between 99.99% and 99.999%.

12. The deformable mirror as in claim 9, wherein the diameter of the deformable mirror is between 2 cm and 5 cm.

13. The deformable mirror as in claim 9, further comprising heat dispersion means arranged to at least partially remove thermal energy from the heat spreader layer.

14. The deformable mirror as in claim 13, wherein the heat dispersion means comprises active water cooling means.

15. The deformable mirror as in claim 13, wherein the heat dispersion means comprises a thermal mass in thermal contact with the heat spreader layer such that excess thermal energy present in the heat spreader is absorbed by the thermal mass.

16. The deformable mirror as in claim 9, in combination with a mirror holder.

17. The deformable mirror as in claim 9, wherein the heat spreader layer is at least co-extensive with the mirror surface.

18. The deformable mirror as in claim 9, wherein the active element is an electro-restrictive layer and the heat spreader layer is interleaved between the mirror surface and the electro-restrictive layer.

19. The deformable mirror as in claim 9, wherein the heat spreader layer is a substrate for the mirror surface.

20. The deformable mirror as in claim 18, comprising a passive substrate interleaved between the heat spreader layer and the electro-restrictive layer.

21. A deformable mirror comprising a mirror surface, an active deforming element, and a heat spreader layer extending across a reverse side of the mirror surface and thermally coupled thereto so as to distribute thermal energy across the mirror surface, the heat spreader layer being disposed between the mirror surface and the active element, and being of an non-metallic material.

* * * * *